INVENTORS
James D. Ireland &
Gerald F. H. Von Stroh

United States Patent Office 3,454,395
Patented July 8, 1969

3,454,395
PROCESS FOR THE REDUCTION OF IRON ORE IN A CUPOLA-TYPE FURNACE
Gerald F. H. von Stroh, 2976 Staunton Road, Huntington, W. Va. 25702, and James D. Ireland, 2513 Marlboro Road, Cleveland, Ohio 44118
Filed Apr. 15, 1966, Ser. No. 542,882
Int. Cl. C21b 1/02
U.S. Cl. 75—40           2 Claims

ABSTRACT OF THE DISCLOSURE

A process for the reduction of iron ore in the cupola type of furnace involving introducing the pulverized ore, pulverized reforming oxides and fuel in the form of pulverized coal particles, into a fluid carrier stream while intermixing these materials in the stream, carrying such materials in fluidized fashion to a combustion chamber supplied with an oxygen enriched combustion supporting medium, combustion taking place therein at about 3600° F., thus to reduce the ore with production of hydrogen and carbon dioxide and controlling the carbon content of the reduced iron by injecting carbon monoxide into the combustion chamber in sufficient amounts to reduce the carbon dioxide content therein at about 40%.

---

Figure 1:
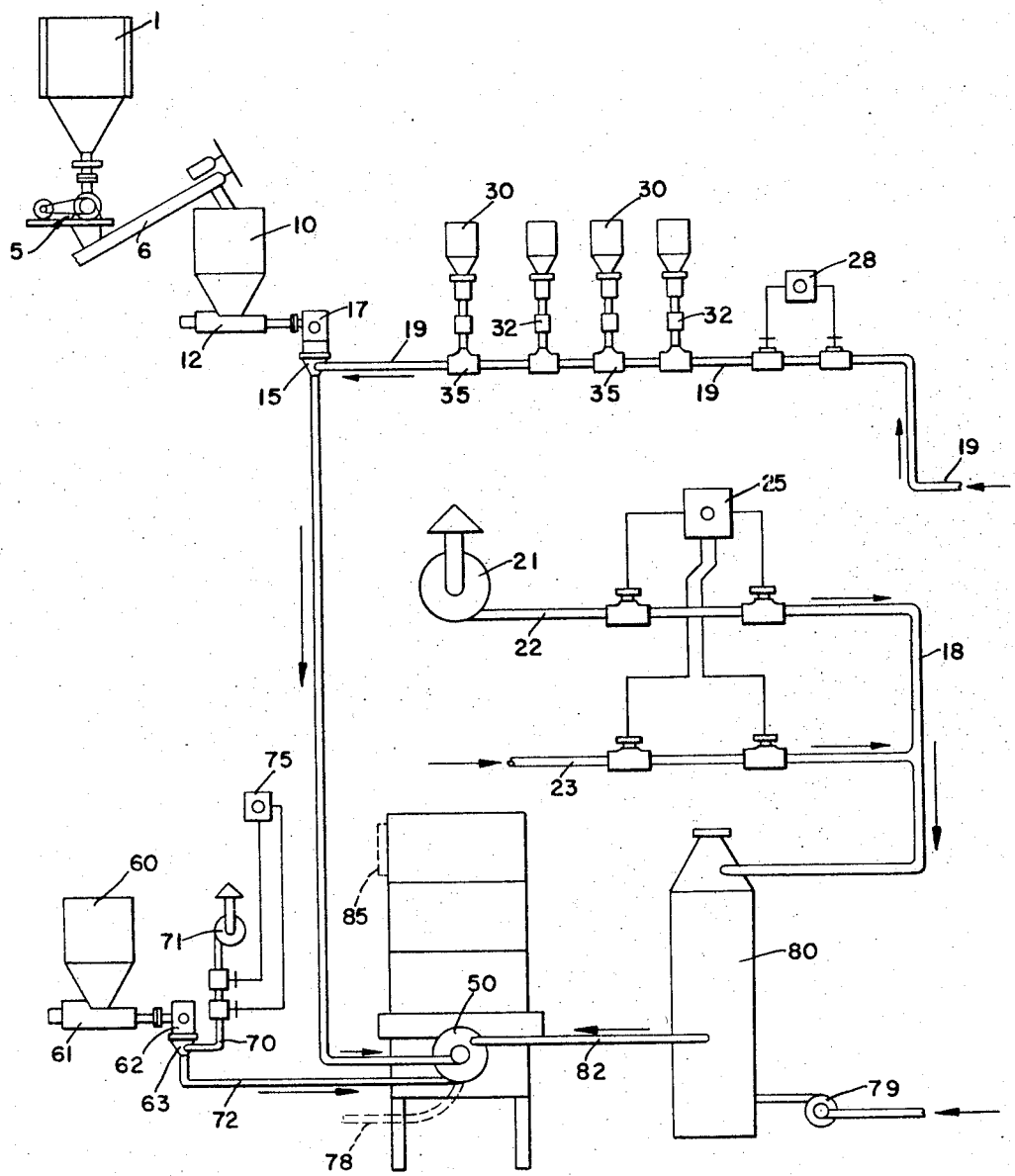

This invention is particularly adaptable, among other uses, to the production of iron containing metal in a cupola, wherein a significant part of the raw material fed to this type of furnace and/or thermoreaction vessel is a metallic oxide. In more particular, the invention is based upon the ability to reduce iron or to a carbon containing iron under cupola conditions. In normal operation of this inventive system the percent of ore that can be reduced approaches 100% of the cupola charge, such percentage averaging between 75 and 100%. Such is in sharp contrast with respect to any conventional operation of the cupola furnace where iron ore reduction, at least to obtain an ultimate product of proper carbon content, cannnot exceed 35%, and will vary somewhere between 5 and 35%. Such variation is resultant upon the character of the ore utilized and also the class or kind of cupola used, that is, whether the same be cold blast water cooled, or hot blast or refractory lined hot blast.

As pointed out in a copending application for patent, Ser. No. 514,625, filed Dec. 17, 1965, in the name of Gerald F. H. von Stroh, and entitled "Externally Fired Cupola and Method of Operation Thereof," there is a fundamental difference between conventional cupola and blast furnace operations—whereas the blast furnace involves ore reduction or refinement, the purpose of the conventional cupola is reformation or alteration of the characteristics of the pig iron produced by the blast operation and charged to the cupola for this purpose. Conventional cupola practices, thus, as indicated, do not connote ore reduction or similar aspects of refining, whereas in the instant case the cupola type of unit is so altered and its operation so adjusted and controlled as to permit a charge of a substantial amount of iron ore to that type of furnace, and to permit not only ore reduction but the production of iron that is suitable for the making of castings, et cetera, thus eliminating the necessity of large amounts of pig iron as the basic charge to the furnace.

Generically, a blast furnace can do what a cupola does but a cupola cannot do what a blast furnace does.

Prior art attempts at even limited ore reduction in a cupola have been unsuccessful. Even rusty scrap when charged to the conventional cupola causes trouble to the extent that some foundries will even clean their scrap before charging. In ordinary practice, the forms of iron oxide ordinarily put into the cupola come out with the slag as indicated by the changes in Fe content in the slag rather than with the iron.

We have discovered that a highly reactive iron ore which can be in very porous form can be reduced in a conventional cupola, providing additional coke is provided to generate sufficient CO to carry on the reduction. This in turn will require an adjustment of air input to the conventional cupola.

The nature of the product metal which is desired for foundry practices, i.e., castings, is in large part dependent upon the carbon content of the iron. Thus, the main difference between steel and grey iron lies in the difference, percentage-wise, of such carbon content. As a general premise a carbon content of less than 2% is classified as steel, whereas if the base metal (iron) contains a carbon content in excess of 2% the resultant product is classified as grey iron. Both of these have many subsidiary designations, not here of primary significance. In any event, the carbon in grey iron is important, both in making castings as well as in the production of steel; with regard to the latter, it has been conventional to obtain carbon containing iron from the blast furnace which produces an iron of about 3.5% carbon.

In the blown oxygen furnace operation the reaction of the oxygen with such carbon to generate heat permits use of some scrap, usually about 35%; and in the production of the higher carbon iron in the cupola varying amounts of pig iron are thus required or the addition of carbon obtained in a much more expensive manner, as by inoculation in the ladle.

Generally, however, the acceptable method is to use pig iron as the carbon source.

With regard to the instant invention, the same contemplates heating iron ore in a carbon monoxide atmosphere under controlled conditions as to temperature and as to the carbon monoxide to carbon dioxide ratio. In such an operation the ore or iron oxide is reduced to iron and some of the carbon from the carbon monoxide goes into solution with the molten metal, the monoxide thus controlling the carbon content of the product metal.

It is also a basic aspect of the instant invention to utilize discrete iron oxide particles which may be charged to the cupola either in the form of natural ores or in agglomerated form, such as pellets. These can be reduced to a carbon containing iron in the cupola by practice of the instant invention in the sense that, in terms of carbon content, the charge of ore will result in the same desired carbon content in the finished iron, as would an equivalent amount of pig iron.

Thus, in principle, and as indicated in the foregoing, the desired result (proper carbon content in the iron reduced from iron ore) is achieved by appropriate adjustment of the carbon monoxide content of the gases in the cupola under operating conditions, such being attained, for example, by either reducing the amount of oxygen entering the cupola or by increasing the amount of carbon (i.e., coke in the conventional cupola practice) charged into the furnace.

With regard to this addition of carbon monoxide for the purposes just mentioned, it has been found that it is possible to reduce iron ore in the cupola by either adding the monoxide as such to the incoming gases fed to the cupola, or injecting carbon monoxide into the cupola as a separate function. It appears that the injection of carbon monoxide provides better over-all efficiency and affects melting rates less if the same is preheated to a temperature equal to or greater than the temperature inside the cupola at the point of entrance into the cupola.

In this regard, it is to be observed that conventional cupola operations generally require a 6:1::10:1 coke ratio or, differently expressed, about 330 pounds of coke per ton of iron to 200 pounds of coke per ton of iron. Yet, when practicing the instant invention it has been determined that, when reducing iron ore in a cupola, it is only necessary, for example, to add about 1,000 pounds of coke per ton of iron produced from the ore. This is substantially less than the amount of coke required per ton or iron produced in the blast furnace and this 1,000 pounds of coke per ton of iron produced from iron ore permits the cupola to operate without changing its melting rate.

Similarly, it has been determined that about 600 pounds of limestone per ton of iron produced from ore is compatible with the amounts of calcium to satisfy the impurity components of the particular ore under treatment. Although this may be somewhat comparable to blast furnace practice, the controlling and important difference is this: appreciation of the fact that the same end result is obtained in the practice of the instant invention by injecting into the cupola the equivalent amount of carbon needed in the form of carbon monoxide, preferably heated to the proper temperature, to attain the ultimate percentage of carbon desired in the product metal.

It is, accordingly, a primary object of our invention to provide a method for the reduction of iron ore in a cupola furnace whether of more or less conventional type, the latter being typified by the structure described in the referred to copending Ser. No. 514,625.

It is another object of the invention to provide a cupola operation wherein the charge thereto is primarily one of iron ore, in the range of from 75 to 100% iron ore, this being present for reduction to iron, the product iron having a carbon content which can be predetermined and fixed, thus lending complete diversification to the process.

It is a further objective of this invention to provide a process for the reduction of iron ore in a cupola furnace wherein such ore may alternately take the form of finely divided ore, fed to the cupola in a gaseous stream containing the cumbustion supporting medium, the necessary mineral oxides, et cetrea; or can be charged through the usual charging door as provided in the conventional cupola.

It is an additional object of the invention to provide means for the control of carbon content in the ultimate product metal by control of the amount of carbon monoxide present during the reduction reaction; this contemplating such procedures as furnishing an air-pulverized coal mixture to the combustion chamber within limits to achieve specified CO to $CO_2$ ratios; or, as another example, injecting carbon monoxide directly into the combustion chamber of the cupola, such carbon monoxide being produced separately in an extraneous combustion chamber for that purpose.

Another object of the invention is the provision of a cupola-type ore reduction system which contemplates not only charging the cupola through the usual upper charging door with the ore to be reduced in lump, granulated or pellet form, but also contemplates a system wherein the ore may be carried to the combustion chamber along with other metallic oxides, as those of calcium, silicon and manganese, each for reformation purposes, in the combustion supporting medium, the latter acting as a carrier for these additions to the charge. Such permits ready regulation or variation of the many involved factors including proportion of iron oxide to the other oxides, variation in the air-oxygen ratio, variation in the $CO:CO_2$ ratio, et cetera, as well as permitting such regulation to be constant and within the operator's control during the time the reduction reaction proceeds.

An additional object of the invention is the provision of a system of the described type wherein, in the consideration of the relatively high temperatures of operation of the cupola, it is feasible to obtain in this same manner reduction of metals other than iron and even to accomplish this with regard to such compositions as bauxite (generally defined as a mixture of $Al_2O_3 \cdot 2H_2O$ and iron oxide), as well as alumina as such.

Finally, it is a basic objective of the invention to provide a simplified procedure for the production of casting metals wherein the blast furnace phase, necessary as a preliminary under present practice and as a step preceding the making of steel, is eliminated. In other words, production of pig iron is normally the required antecedent to the production of casting metals in the ferrous category, whereas here ore reduction, control of carbon content to the desired degree in the ultimate product, and control of other required additions to the metal to meet required specifications, is all accomplished in one swift and efficient procedure in the cupola.

Figure 2:
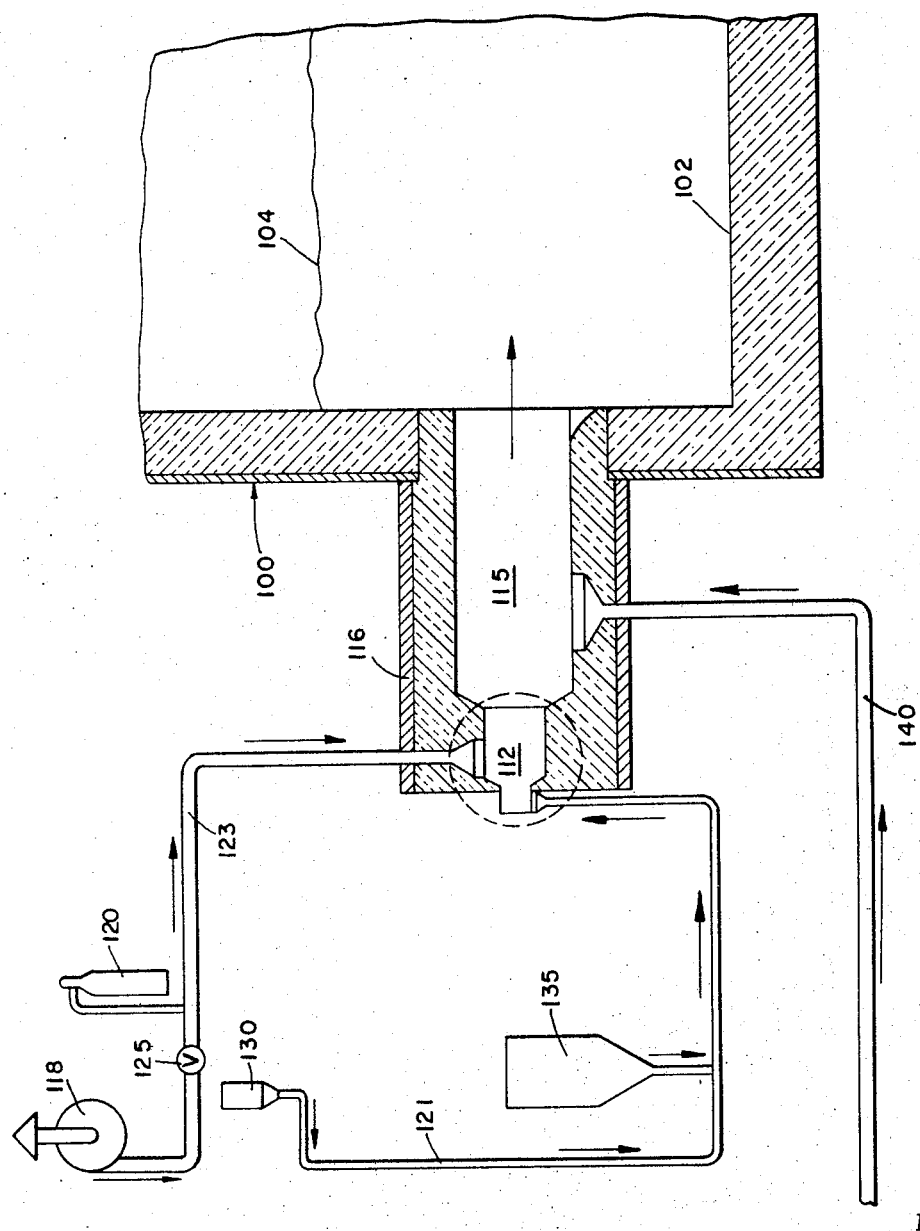

This invention will be described in somewhat more detail in the following, wherein reference is made to drawings of a suitable system, or apparatus to achieve the foregoing objectives, and wherein:

FIGURE 1 is a flow sheet, or largely diagrammatic showing of the overall system contemplated by the invention; and, FIGURE 2 is an enlarged illustration, again somewhat diagrammatic, showing the arrangement of the feed of gases and materials to the burner and combustion chamber of a cupola of the externally fired type, and wherein the fuel utilized is pulverized coal, carried with oxide additives in the combustion supporting medium to the cupola burner. It should be noted in this regard that other fuels, as gas or oil, singly or in combination, may be used.

Referring in more particular to these, and viewing FIGURE 1, it is seen that here in this embodiment of the invention all, or at least a substantial part of the fuel for combustion purposes, consists of raw coal which is here fed, in lump form, to a jacketed hopper—dryer 1, the latter discharging the same to a suitable type of coal pulverizer, generally indicated at 5. From this pulverizer the now pulverized coal, preferably of about 100 mesh size, or less, is discharged to a screw conveyor 6, by which it is transported to a pulverized coal hopper 10. The latter again discharges, at its lower end, to any type of known feeding mechanism 12 which enables transport of these particles of coal to a coal carrier gas or liquid mixer 15, the feed to this mixer being regulated or controlled by a preceding coal feed meter 17.

Also, fed to this mixer 15 is a supply of carrier gas or liquid, or a combination of both, through line 19.

The air supply is furnished by a pump mechanism 21 which feeds air through line 22, with an oxygen supply being fed through line 23, both of these joining together in line 18, the latter leading through a suitable preheater and thence into the burner 50.

It is desired, of course, that some means be provided to control the proportion of air to oxygen in order that the rate of combustion, and depending upon the rate of fuel admission, in turn be subject to regulation, and to this end an air-oxygen ratio controller, 25, is interposed in parallel fashion across the air inlet line 22, and the oxygen line 23. Such ratio controllers are well known to those skilled in the art and the same need not, therefore, be further described herein.

Similarly, and preceding the oxide feed mechanism, the rate of flow of the carrier gas-liquid is controlled by a metering device 28, also well known to the art and variable within the limitations established by the operator.

Between the described coal-carrier mixer 15, and controller 28, and in this same line 19, is interposed a series of mineral oxide feeding devices. Reference is here made to the feed of such oxide as those of calcium, silicon and manganese. These are inserted in pulverized form into the stream of combustion supporting medium for the purpose of proper reduction of the ore and are provided for much the same purpose as such materials are provided in, e.g., blast furnace operation. With respect to this phase of operation, however, it is emphasized that one or more of the means to feed such pulverized materials into the air-oxygen stream may be utilized to inject into that stream at the same time a greater proportion of the ore, as iron ore, of the metal sought to be reduced. Again, this in the contemplation of this embodiment of the invention, would be in pulverized form.

In any event, these sources of oxide feed, inclusive of various types of reforming oxides and optionally including the oxide of the metal to be reduced, comprise a series of mineral oxide hoppers 30, to receive such oxides in ground or pulverized form of such mesh size that will facilitate their conveyance to the cupola in "fluidized" fashion, in other words, carried in the stream of the carrier liquid or gas. Discharged from such hoppers 30, these pulverized materials are fed through, in each instance, a meter 32, the latter controlling rate of flow into line 19. Disposed in the latter and interconnected with each of such meters 32, are a series of mineral oxide-carrier gas or liquid mixers 35, of usual type, and of a design to assure thorough mixing of the pulverized material from each hopper 30 into the conveying stream.

Thus, at the juncture of line 19 with the coal-carrier mixer 15, is found a combination of pulverized materials, conveyed in the carrier medium and consisting of the fuel (coal), different mineral oxides, as desired, and including also, if desired, a major proportion of the oxide of the metal which is sought to be reduced.

This combination of carrier medium and mixture of coal and oxides is then fed to the burner 50, preferably of the cyclone type, and positioned for feed-in directly to the lower portion of the cupola, and as more particularly described and shown in the said application Ser. No. 514,625.

At this point, and under certain operative conditions wherein the coal feed is desired to be increased for additional control functions, an auxiliary mechanism or system is provided. In the graphic illustration here employed, such additional fuel is first charged to an auxiliary coal hopper 60, the fuel here again being in pulverized form of the required mesh size. From the latter, in similar fashion, the same proceeds through a feeder mechanism 61, a coal feeder 62, and a coal meter 63, the latter, as its name indicates, controlling rate of feed. Additional carrier is also fed to 63 through supply line 70, so that this auxiliary coal supply may likewise be mixed in such gaseous stream for transmission, through line 72, to the aforesaid cyclone burner 50.

Air as a carrier may be obtained from the atmosphere and pumped through the usual device 71, the line 70 being again provided with an automatic and settable mechanism 75 to regulate, in predetermined fashion, the amount of air that is to be injected into the pulverized coal stream.

Mention in the foregoing has been made of the desirability of using carbon monoxide injection as a means of incorporation, in the ultimate casting or other material, of the desired amount of carbon, obviously in order to fix the ultimate characteristics (malleability, hardness, tensile strength, et cetera) of the product metal, as well as performing the function of fluxing the slag, et cetera. In this regard, additional CO may be supplied through line 78, which source feeds directly into the combustion chamber of the burner 50. If a direct supply of carbon monoxide of this nature is desired, it is obtained from an external source. The latter may be any type of burner, as, for example, a simple coal burner, wherein combustion is so regulated as to produce a predetermined amount of carbon monoxide. The latter is entrapped, in again predetermined amounts, and fed into the cupola burner in the manner indicated. In this fashion a close and strict regulation of the CO to $CO_2$ ratio or proportion may be obtained. And in this fashion, due to the known reactions obtainable with regard to carbon monoxide, where the same is reduced to the element carbon, the carbon content of the melt can be regulated.

In order to improve thermal efficiency it may be desirable to preheat the combustion supporting medium. In this regard natural gas may be injected, as by blower 79, to a suitable combustion supporting medium preheater 80. In this eventuality, line 18 heretofore described with reference to the combustion supporting medium can be extended downwardly to discharge a predetermined and required amount of air or oxygen or a mixture of both through the preheater 80, so as to raise the temperature of this gaseous stream upwardly from ambient to about 1800° F., it then being discharged through line 82 from the heater to the burner 50, positioned as indicated upon the cupola.

Reference has been made in the foregoing to supplying the major proportion of the charge to the cupola (i.e., iron oxide for reduction purposes) through one or more of the oxide feed means 30. However, an alternate operation involves confining these oxide feeds to supplemental additions of the oxides of calcium, silicon, et cetera. In such instances, the main charge of the ore to be reduced can be charged into the cupola through the usual charging door 85, as indicated in dotted line in FIGURE 1. Such a charge can consist of native, lump size ore, or of iron ore pellets of the required size. In any event, controlled regulation, and essentially of carbon content, of the melt, is obtained through control of rate of feed of the supplemental oxides, rate of feed of the primary and auxiliary pulverized fuel supply, regulation of the air oxygen proportion, and regulation of the carbon monoxide.

A simplified version of the invention, more or less in diagrammatical form, is found in FIGURE 2, in this instance accent being placed upon the feed to the secondary combustion chamber of additional finely divided carbon for control purposes, as per the reaction $CO_2 + C \rightarrow 2CO$. In other words, in this illustration is found this generic illustration of the invention—the use of pulverized coal as the fuel, the carrying in the carrier stream of additional pulverized oxides for metal reformation purposes in the same stream, and as indicated, the addition of carbon as required to the secondary chamber of the burner.

It is here contemplated that such system be used in conjunction with an externally fired cupola, i.e., one where the burner and both primary and secondary chambers thereof are disposed externally of the cupola but feed directly to the lower well portion of same. In such instances it is contemplated that a relatively fixed bed be used to obtain better permeability and eveness of heat applied to the charge. This is possible due to the elimination of the usual coke bed, which as found in ordinary cupola operations, is subject to variation in height.

The cupola is generally indicated at 100. It is provided with a lower portion of the charge being indicated at 102 and the top of the bed being also graphically indicated at 104.

The burner, disposed as indicated externally of the cupola, includes a primary combustion chamber 112 and a secondary chamber 115. Temperatures reached in the former may be in excess of 4000° F. and temperatures, for the purposes herein described, in the secondary chamber may be controlled within a range of about 3000° F. to 3600° F.

Air is obtained from the atmosphere by means of the usual blower 118 and fed through line 123 directly to the primary combustion chamber. Such air may be commingled with oxygen obtained from a source of supply 120, and the air-oxygen mixture, if desired, regulated by valve 125, this ultimately also being fed into the primary chamber through line 123. Here, again, various oxides as silicon oxide, manganese oxide, phosphorous oxide, calcium oxide, et cetera, are conveyed to the burner in pulverized form from hopper 130 through line 121, and along with the carrier gas as liquid.

The fuel in this embodiment of the invention consists entirely of pulverized coal, also discharged into the carrier line 121 by means of a suitable feed hopper 135, and also thus carried in the carrier stream to the burner.

The carbon dioxide-carbon monoxide ratio is, of course, in part controllable within prescribed limitations by the proportion of the pulverized coal-carrier mixture fed to the combustion supporting medium via line 123. However, further control of the ratio is enabled by an additional feed in line 140, supplying carbon and/or carbon monoxide, as indicated, directly to the secondary combustion chamber 115.

The function of reducing iron ore in a cupola is enhanced when the highly reactive and more porous ores (natural or synthetic) are used. If the cupola be charged through the usual charging door with lump iron ore, then types of the direct shipping variety, varying from the rich (65% iron) down through the so-called "standard" ores (51.5% iron) may be utilized. Where the ore is not injected in pulverized form, as mentioned in the foregoing, the operation is facilitated by the use of iron ore pellets made from hematite, and in such instances the ore in that form may comprise the majority of the charge, i.e., from 75% to 100% iron ore pellets. This is possible due to control of CO in the combustion chamber, as herein set forth.

Thus, the iron oxide can be in the form of a very porous naturally occurring ore or consist of agglomerates of finely divided ore made into pellets, briquettes or nodules having adequate surface area internally and externally to permit the fast reduction of the ore to iron. Obviously, putting in very finely divided ore (for example minus 60 mesh) into a cupola will have the result of the finely divided particles being blown out of the cupola by the blast of gases necessary in conventional operation. However, if the finely divided ore is formed into a pellet, loosely compacted so that there are many voids in the pellet, the gases will have the opportunity of entering and reacting with each individual particle of which the pellet is made.

While it requires more B.t.u.'s of heat to reduce iron ore than it does to melt iron, the operation of the cupola is dependent upon a given amount of heat at a given temperature (the range of from about 2000° F. to 3000° F). Since the reduction of iron ore to iron by carbon monoxide will take place with temperatures starting under 1200° F., heat that is wasted can be used to promote the reduction of iron ore in the cupola, that is, if there is an adequate amount of carbon monoxide gas present in relation to the carbon dioxide present. Hence, the importance of this $CO_2:CO$ ratio.

The efficiency of the reduction of ore in the cupola is also dependent, in large part, upon the size of the ore used. For a given ore the rate of reduction in inches per hour will be constant. For example, if the reduction reaction proceeds through a piece of a particular type of ore at the rate of one-eighth inch per hour, it will do so within reasonable limits regardless of the size of the piece. A quarter inch piece would then require one hour, a half inch piece, two hours, et cetera. It is known that this constant will be different for different ores in the magnitude of 1:6. Thus, a given ore may have a reduceability rate of three-fourths of an inch per hour, while another ore of the same chemical composition will have a rate of one-eighth inch per hour. Therefore, a pellet made from a highly reactive iron oxide base but in such a manner as to be very porous and, therefore, present a maximum surface area with a minimum unit mass, can most effectively be reduced under the time-temperature conditions of cupola operation.

With regard to the instant method pointed to reduction procedures in the cupola, the latter may be classed in accordance with the ability, under operative conditions, to generate carbon monoxide at a constant melting rate.

In this respect, the reaction of $CO_2+C \rightarrow 2CO$ will take place at temperatures well below the melting point of iron and reach a high order of rate of reaction at 1200° F. This rate of reaction in accordance with the foregoing equation will also vary with different types of carbon, conventional cupola coke having a rather slow rate. Since the stated reaction is endothermic, its presence in the oxidizing and melting zone is undesirable, but because of the high heat loss in the cupola above the melting zone the right combination of coke and iron ore can and does produce carbon containing iron in the solid state above the melting zone without affecting the melting rate. It should be noted that the presence of $CO_2$ slows down the rate of reaction between the CO gas and the iron oxide. Therefore, a high ratio of CO to $CO_2$ is desirable and preferably controllable.

If the conventional fuel (coke) be used in the operation of the cupola in a reduction procedure the relatively fixed bed thereof, as mentioned in the foregoing, becomes essential. Also, permeability of such bed is a requirement. In this regard the rate of oxidation of coke to produce carbon monoxide is a function of surface area exposed to $CO_2$ in the combustion area. Since coke is not porous, in the sense that gas will not penetrate to the center of the piece, permeability depends upon the use of discrete pieces of coke of relatively small size so that, everything else being equal, a higher rate of carbon monoxide generation is attained. The size of the coke, therefore, is dictated by the requirement of permeability, the size on the other hand not being so reduced as to reduce permeability and require higher air pressures for the same rate of combustion.

If pulverized ore is used as the charge to the cupola for reduction purposes, then the size of same is also significant. It is preferred that the maximum size be no greater than one-half inch to permit reduction under the time and temperature conditions contemplated by this method of cupola operation. The preferred size of iron ore is minus 100 mesh and with a range thereof, as to size, of from one-eighth inch to one-half inch.

The injection principle (directly into the burner) of introducing carbon monoxide has been mentioned in the foregoing. In the same vein, water injection will produce the same result. In other words, if water or steam be introduced into the burner, at temperatures between 2000° F. and 4000° F., carbon monoxide is produced in accordance with the following reaction: $H_2O+C \rightarrow CO+H_2\uparrow$. The hydrogen resultant itself is a reducing agent and tends to hasten the reduction of the ore in this regard. There are, of course, practical limitations to the use of water injection in the sense that an upper practical limit must be observed—water injection necessarily results in a cooling effect. Accordingly, it may be desirable, in some instances, for control of the $CO:CO_2$ ratio to use water injection in conjunction with additions of CO to the secondary combustion chamber of the burner. At any rate, using a cyclone burner having a secondary chamber, particularly in the externally fired type of cupola, the $CO:CO_2$ ratio can be maintained at a constant. Although a 100% $CO_2$ atmosphere at 4000° F. is impossible, since about 34% of the $CO_2$ will break down into carbon and oxygen, at the operating temperature of 3600° F. the maximum $CO_2$ will be 84%. However, by the addition of CO as by means of line 140 to the secondary chamber (FIGURE 2) the $CO_2$ can be reduced to about 40% with an exit temperature of 3600° F. effectively maintained.

In summary of the basic concept of the instant invention, it is to be appreciated that carbon monoxide control in the cupola, i.e., its presence in controlled amounts therein, does relate directly to the amount of carbon, percentagewise, that is desired to be present in the reduced metal product. This is in sharp contrast to conventional cupola procedures wherein the principal purpose is to melt iron to permit it to be cast, as well as to remove undesirable elements. Conventional firing of a cupola is aimed at generating heat to melt the metal. As carbon monoxide in the effluent gases represents inefficient combustion, cupola operators select materials and conditions of operation which produce a minimum of carbon monoxide. It has been found, however, and as indicated in the foregoing, that discrete iron oxide particles, either in the form of natural ores or in agglomerated form, such as pellets or sinter, can be reduced to carbon containing iron in a cupola, and that in terms of iron content, the ore produces the same carbon content in the finished iron as could an equivalent amount of pig iron. This is all achieved by carbon monoxide adjustment in relation to the gas content in the cupola.

As mentioned previously, the rate of reduction of a given amount of mineral oxide, everything else being equal, is in relation to the exposed particle size, or, more accurately, the surface area exposed. Therefore, one ounce of minus 400 mesh metallic oxide could be reduced to its elemental form in a very small fraction of the time it would require to reduce one ounce of the same oxide in the form of a single cube.

Therefore, if finely divided metallic oxide is intimately mixed with the fuel either in the burner or preferably before the burner, and the fuel burnt at something less than 100% stoichiometric almost instantaneous reduction of the oxide will take place.

For example, in one test a silica oxide having an average particle size of 60 mesh was mixed with fuel and fed through the burner approximately 20% of the silica oxide was reduced to silicon, whereas when minus 300 mesh silica oxide was mixed with coal and fed through the burner approximately 90% of the silica oxide was reduced to silicon.

Needless to say the amount of carbon in the fuel in relation to the available oxygen was adjusted so that there was, in both instances, sufficient excess carbon present to reduce the silica oxide to silicon.

In many metal producing operations, i.e., iron castings or steel, certain waste metals are generated. For example, in ordinary foundry operations the amount of unsaleable metal in the form of scrap castings, gates, sprues and/or risers, may amount to over 30% of the metal poured in a given day. Similarly, in the rolled steel products, such as plate sheet, certain scrap is generated in quantities ranging from 10 to 30% of the original ingots rolled.

This scrap metal is usable when melted and reformed. It is, therefore, quite practical to envision a cupola-type furnace wherein the self generated scrap metals are placed into the cupola through the conventional charging door and iron oxide mixed with coal is reduced in the burner and introduced into the cupola through the bed of the cupola. Surplus heat and products of combustion from the burners and from the reducing oxides pass upwardly through the porous bed melting said scrap metals and thus causing them to commingle with the previously produced iron from iron oxide.

Our experiments have indicated the ability to produce ferrous products with a carbon content in excess of 4%, as well as a carbon content as low as 2.5%. A more sophisticated reduction to practice of this invention should lead to ferrous metals having carbon contents well below 2% even when using iron oxide as the only source of iron in the finished product.

From time to time the market price of scrap metals varies. For example, at certain times cast iron borings have been the cheapest source of iron per unit of contained iron, and at other times certain forms of steel scrap have been the lowest cost source of iron per unit of contained iron, in many instances being substantially lower per cost of contained unit of iron than iron ore. The ability to reduce iron ore under the conditions described herein should permit an almost unlimited flexibility in the utilization of various sources of iron-containing materials.

We claim:
1. A process for reducing ferrous oxide in a cupola-type of furnace having a melting zone therein comprising entraining reforming oxides in a pulverized form in a fluid carrier stream, introducing said ferrous oxide in pulverized form in said fluid carrier stream, introducing pulverized coal particles in said fluid carrier stream while intermixing said coal particles with said reforming oxides, whereby said ferrous oxide, said reforming oxides and said coal particles are conveyed in fluidized fashion in said stream, simultaneously introducing said stream and an oxygen enriched combustion supporting medium into a combustion chamber, combusting said coal in said combustion chamber at a temperature of about 3600° F. whereby hydrogen and carbon dioxide is produced and said ferrous oxide is reduced, and controlling the amount of carbon content in said reduced ferrous oxide by simultaneously injecting carbon monoxide from an external source into said combustion chamber, the amount of said carbon monoxide injected into said chamber being sufficient to control said carbon dioxide content of the combustion gases in said combustion chamber at about 40%, and discharging the products in said combustion chamber to said melting zone.

2. The process as defined in claim 1 wherein said coal particles and said reforming oxides contain sulphur, said reforming oxides being selected from the group consisting of calcium oxide, silicon oxide and manganese oxide, and said sulphur is reacted in said melting zone to form slag.

References Cited
UNITED STATES PATENTS

| | | | |
|---|---|---|---|
| Re. 12,424 | 12/1905 | Brown | 75—26 |
| 719,320 | 1/1903 | Foster | 75—42 |
| 943,599 | 12/1909 | Hubbard. | |
| 1,507,214 | 9/1924 | Somers et al. | 75—41 |
| 1,831,254 | 11/1931 | Meloche | 266—25 X |
| 1,858,548 | 5/1932 | Ives | 266—25 X |
| 2,149,480 | 3/1939 | Paschke | 75—41 |
| 2,195,866 | 4/1940 | Le Clarick | 75—25 X |
| 2,544,697 | 3/1951 | Lewis | 75—41 X |
| 2,612,444 | 9/1952 | Rummel | 75—40 |
| 2,750,276 | 6/1956 | Marshall | 75—38 X |
| 2,824,792 | 2/1958 | Rees et al. | 75—26 |
| 2,833,643 | 5/1958 | Newman | 75—25 X |
| 3,167,421 | 1/1965 | Pfeiffer et al. | 75—42 |
| 3,338,707 | 8/1967 | Carli et al. | 266—25 X |

L. DEWAYNE RUTLEDGE, *Primary Examiner.*

HENRY W. TARRING II, *Assistant Examiner.*

U.S. Cl. X.R.

75—41, 43